C. W. G. ALLENDER.
CLAMP FOR PROTECTING TIRES.
APPLICATION FILED DEC. 3, 1921.
1,426,532. Patented Aug. 22, 1922.
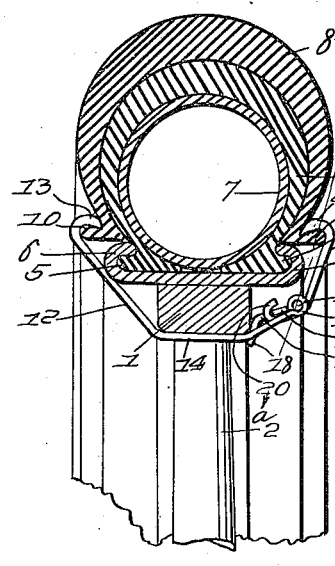
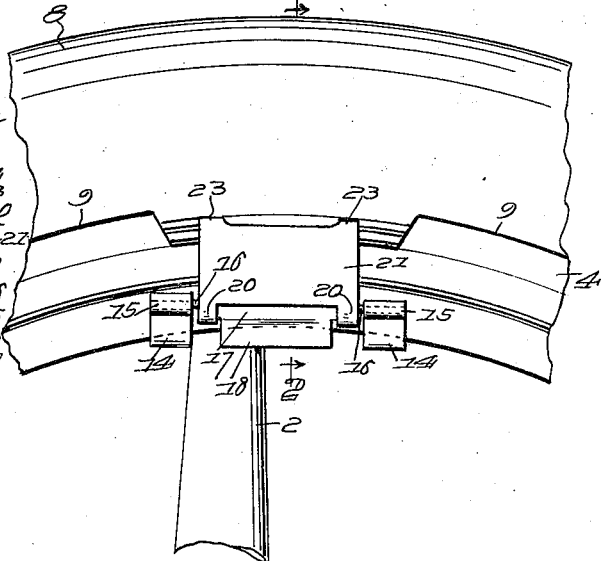
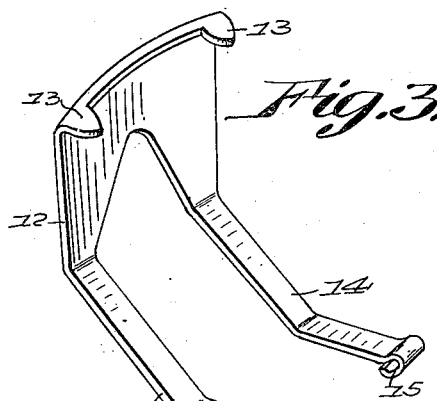
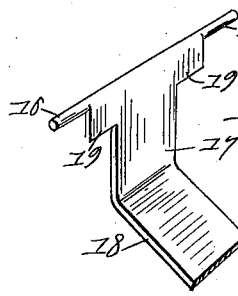
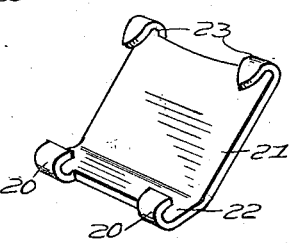
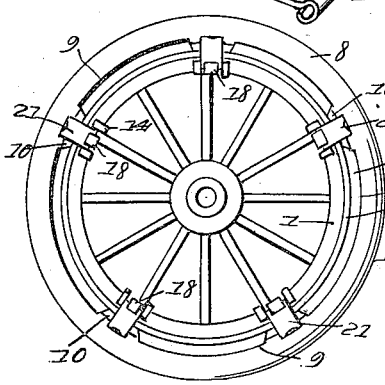
Inventor
Charles W. G. Allender,
By Watson E. Coleman
Attorney

UNITED STATES PATENT OFFICE.

CHARLES W. G. ALLENDER, OF DENVER, COLORADO.

CLAMP FOR PROTECTING TIRES.

1,426,532.  Specification of Letters Patent.  Patented Aug. 22, 1922.

Application filed December 3, 1921. Serial No. 519,629.

*To all whom it may concern:*

Be it known that I, CHARLES W. G. ALLENDER, a citizen of the United States, residing at Denver, in the county of Denver and State of Colorado, have invented certain new and useful Improvements in Clamps for Protecting Tires, of which the following is a specification, reference being had to the accompanying drawings.

It has been found that in making long trips in automobiles, the tires are subjected to considerable wear, thereby greatly shortening the life of the tire. This is particularly true after the tire has become partly worn.

Therefore, it is the purpose of the present invention to utilize cast off tires, for protecting those that are in use. For instance, tires which are three inches in diameter may be covered by a cast off tire, which is ordinarily three and one-half inches in diameter. In fact the cast off tire has its clincher flanges cut away at intervals as shown, thereby leaving projecting parts of its clincher flanges, which will be engaged by clamping means to hold the protecting cast off tire on the used tire. The reason for cutting away the clincher flanges in this manner is to permit the cast off tire to be stretched over the used tire, while the latter is in a deflated condition.

In order to hold the protecting tire in place on the used tire and to hold the adjacent severed ends together, the present invention has for another purpose the provision of an improved clamp, which engages with the felly, and consists of one section having clincher hooks to engage one of the clincher flanges of the protecting tire, in combination with another section having clincher hooks to engage the opposite clincher flange of the protecting tire, there being a connecting clasp pivotally carried by the first section and adjustably engaged by the second section, to hold the sectional clamp in place.

Still another purpose has to do with spacing the clincher hook so that it may engage on either side of the joint between the adjacent severed ends of the protecting tire, to hold the adjacent ends securely together and to prevent displacement.

A further purpose consists in providing the clincher section of the clamp with elongated spaced arms to straddle any one of the spokes of the wheel, to hold the clamp in position, prevent its creeping, as well as preventing creeping of the protecting tire.

A still further purpose has to do with so constructing the connecting clasp, that when it is disposed in a position to draw the two sections of the clamp into secure engagement with the opposite clincher flanges of the protecting tire, the points of engagement of hooks of one section with the clasp are disposed at positions to one side of the pivot of the clasp, when the clasp is disposed in a locked position. In other words the points of engagement of one section with the clasp are disposed to one side of a line *a—a* passing through the pivot of the clasp and where one section engages one of the clincher flanges of the protecting tire, thereby preventing disconnection of the sections of the clamp, that is, when the clasp is moved to a locked position in engagement with the felly.

The invention further aims to sharpen the clincher hooks of the section to the clamp, so as to firmly engage the opposite clincher flanges of the protecting tire, to insure holding the protecting tire in position.

Also it is the aim to provide clamp sections which may be inexpensively manufactured and sold at a fair profit, and still further the invention has to do with constructing the clamp sections and the clasp, so that each part may be made by one stamping, or by means of a drop forge method.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of a portion of a wheel felly and its rim showing the tire to be protected, and the protecting tire in place, and illustrating the clamp applied;

Figure 2 is a sectional view on line 2—2 of Figure 1;

Figure 3 is an enlarged detail perspective view of one of the sections of the clamp, namely the one which straddles the spoke of the wheel;

Figure 4 is a detail perspective view of the other clamp section;

Figure 5 is a detail view of the clamp, which is disposed relatively to the other clamp sections, showing how all three parts may be easily assembled;

Figure 6 is a detail view in side elevation of an entire wheel, showing a plurality of clamps applied, with certain of the arms 14 engaging certain sides of the spokes, while other of said arms 14 engage certain other opposite sides of the spokes of the wheel.

Referring to the drawings, 1 designates the felly, 2 the spokes, and 3 the rim, which may be mounted upon and secured to the felly in any suitable manner. The usual tire 4 which is designed for use on the rim has its clincher flanges 5 in engagement with the usual clincher flanges 6 of the rim, and 7 denotes the inner tube of the tire.

In order to protect the usual tire 4, which is in use, a protecting tire 8 is provided. This protecting tire is constructed from cast off tires, and the opposite clincher flanges thereof are cut away at intervals, as shown at 9, thereby leaving projecting clincher flanges 10. The purpose of cutting away the clincher flanges of the protecting tire, is to engage said tire to be stretched sufficiently, so that it may be fitted over the used tire. The protecting tire is designed to be of a diameter in cross section, large enough to engage over the tire in use. Furthermore the protecting tire is designed to be large enough in its radius to fit over the used tire 4. When the protecting tire is applied, its clincher flanges 10 are disposed so that their inner portions rest upon the clincher flanges 6 of the rim, as shown clearly in Figures 1 and 2 especially the latter.

The clamp for holding the protecting tire in position comprises a dominant clamp section 11, which consists of a plate 12 provided with clincher hooks 13, which have their ends sharpened or pointed, so as to engage with one of the clincher flanges 10 of the protecting tire. Projecting from the plate 12 are the arms 14, which straddle one of the spokes 2 of the felly, in fact the arms 14 engage on the inner face of the felly on either side of the spoke, thereby not only preventing creeping of the clamp, but also preventing creeping of the protecting tire. These arms 14 terminate in eyes 15, in which the aligned pintles or trunnions 16 of the clasp 17 have bearings. The eyes 15 are slightly open in order to permit the trunnions 16 of the clasp 17 to stop in their bearings, when the clasp is connected. In this way the clasp can be easily and very quickly detached, when dismantling the protecting tire. This clasp 17 is preferably angular as shown, though it may be otherwise shaped, so that the lateral part 18 may engage the side of the felly when the clasp is in a locked position. The opposite edges of the clasp adjacent where the pintles or trunnions 16 are formed, are provided with shoulders 19, which are engaged by the hook lugs 20 of the other clamp section 21. Adjacent where the hook lugs 20 are formed, the clamp section 21 is bent at an obtuse angle as at 22, so as to engage over the pivoted end of the clasp, when the clasp is in a locked position. The hook lugs 20 are spaced sufficiently to straddle the reduced portions 18 of the clasp. The clamp section 21 has spaced clincher hooks 23, which are sharpened to engage firmly in the other clincher flange 10 of the protecting tire, and are spaced sufficiently to insure a wide range of engagement with the protecting tire, thereby holding the protecting tire in place.

When the clasp is locked, it will be noted that the hook lugs 20 when in engagement with the shoulders 19 are disposed on one side of the journals of the trunnions 16, namely at a point adjacent the felly of the wheel and on one side of the line a—a, thereby drawing the protecting tire tightly in place and in engagement with the tire which is in use.

In order to apply the protecting tire 8, the tire 4 which is in use is first deflated, then the protecting tire is stretched due to the cut away portions 9 of the clincher flanges 10 sufficiently to allow it to be fitted over the used tire 4, after which the tire 4 is then properly inflated. The clamps are then applied with the clincher lugs engaging the projecting clincher flanges 10 of the protecting tire to hold the same in position. The purpose of applying the clamps which are designed to be arranged at intervals, before the tire 4 is entirely inflated, is to enable the protecting tire and the flange to be properly positioned, and after properly positioned the tire 4 is entirely inflated, then the clamp will draw and hold the protecting tire firmly in place. As shown in Figure 6 there are several clamps provided, and it will be noted that the dominant clamp section 11 has its arms 14 engaging one side of certain of the spokes 2 of the wheel, while the arms 14 of certain other of the clamping sections 11 engage corresponding opposite sides of other of said spokes 2 of the wheel, thereby in this way preventing the protecting tire 8 from creeping. From the foregoing, it is obvious that an improved form of clamp is provided, for attaching protecting tires to tires which are in use, thereby enabling the latter to be fully protected, especially on long trips where rough roads are encountered, thereby prolonging the life of the tire, and at the same time acting to prevent puncturing the main tire, to some extent. This is due to the fact that the member which may puncture the tire will have to pass through the wall of the protecting tire and then through the main tire, in order to reach the inner tube.

The invention having been set forth, what is claimed is:—

1. As an article of manufacture, a clamp for tire protectors, comprising dominant and auxiliary clamp sections, the remote ends of which being provided with means for engagement with the opposite clincher flanges of the tire protector, the dominant clamp section being U-shaped and adapted to straddle the spoke of a wheel, a clasp having a portion of a width equal to the space between the sides of the U-shaped clamp section, said clasp having pintles, the sides of the U-shaped clamp section having bearings for the reception of said pintles, the auxiliary clamp section having spaced hooks, said clasp having a reduced portion of a width equal to the space between said hooks, said clasp having shoulders caused to be formed by the reduced portion and being engaged by said spaced hooks, whereby upon moving the clasp so that its reduced portion may engage the felly of the wheel, the shoulders with the hooks engaged therewith may assume positions between the fulcruming pintles and the felly, to draw the clamp sections tightly in position and hold the tire protector securely in place.

2. As an article of manufacture, a clamp for tire protectors, comprising dominant and auxiliary clamp sections, said dominant clamp comprising spaced arms having bearings, a clasp fulcrumed in bearings of said arms, the auxiliary clamp sections having spaced hooks, said clasp having shoulders with which said spaced hooks engage, said clasp having a portion extending at an obtuse angle to the fulcrumed body of the clasp and adapted to engage the felly of a wheel, whereby the shoulders with the hooks engaged therewith may assume positions between the fulcrum of the clasp and the felly for locking the clamp sections in position and tightening them and the tire protector in position.

In testimony whereof I hereunto affix my signature.

CHARLES W. G. ALLENDER.